United States Patent
Endo et al.

(10) Patent No.: US 6,442,928 B1
(45) Date of Patent: Sep. 3, 2002

(54) CONTROL SYSTEM FOR GAS TURBINE

(75) Inventors: Tomoyoshi Endo, Hitachi; Hideaki Kaneda, Hitachinaka; Yotaro Kimura, Hitachi; Yasutaka Komatsu, Hitachi; Tsugio Suzuki, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/998,792

(22) Filed: Dec. 3, 2001

Related U.S. Application Data (63) Continuation of application No. 09/478,983, filed on Jan. 7, 2000, now Pat. No. 6,338,240.

(30) Foreign Application Priority Data

Jan. 8, 1999 (JP) .............................................. 11-2589

(51) Int. Cl.[7] .................................................. F02C 9/00
(52) U.S. Cl. ................................... 60/39.27; 60/39.281
(58) Field of Search ................. 60/39.091, 39.27, 60/39.281, 773

(56) References Cited

U.S. PATENT DOCUMENTS

| | | | |
|---|---|---|---|
| 5,327,718 A | 7/1994 | Iwata et al. ............... | 60/39.27 |
| 5,584,171 A | * 12/1996 | Sato et al. ................. | 60/39.27 |
| 5,878,566 A | 3/1999 | Endo et al. .............. | 60/39.281 |
| 6,026,644 A | 2/2000 | Ito et al. .................... | 60/39.27 |
| 6,145,297 A | * 11/2000 | Nagafuchi et al. ....... | 60/39.281 |

FOREIGN PATENT DOCUMENTS

JP          7-63334          3/1995

* cited by examiner

*Primary Examiner*—Louis J. Casaregola
(74) *Attorney, Agent, or Firm*—Mattingly, Stanger & Malur, P.C

(57) ABSTRACT

A control method of a gas turbine provided with a plurality of combustors each of which has a first stage combustion part effecting diffusion combustion and a second stage combustion part effecting premixed combustion, comprises: monitoring a quantity of state representative of the combustion condition of the combustor or gas turbine, and regarding the combustion condition as being abnormal combustion when the quantity of state exceeds an allowable value and lowering gas turbine load to a predetermined partial load, thereby to continue the operation.

14 Claims, 4 Drawing Sheets

CONTROL SYSTEM FOR GAS TURBINE

This is a continuation application of U.S. Ser. No. 09/478,983, filed Jan. 7, 2000 now U.S. Pat. No. 6,338,240.

BACKGROUND OF THE INVENTION

The present invention relates to a control method of a gas turbine and, more particularly to a control method of a gas turbine which is provided with two stage type combustors each having a first stage combustion part effecting diffusion combustion and a second stage combustion part effecting premixed combustion.

Each combustor of the gas turbine which is provided with a plurality of two stage type combustors and generally used has a first stage combustion part in which diffusion combustion is effected and a second stage combustion part in which premixed combustion is effected, as disclosed in JP A 7-63334. One of features of the two stage type combustors of this kind of a gas turbine is that a fuel air ratio or a ratio between a fuel quantity and an air quantity changes very widely from starting to a rated load operation.

The gas turbine having two stage type combustors is possible to achieve low NOx combustion even in this very wide range of change in fuel air ratio, and the low NOx combustion is achieved by combustion control of the first stage combustion part and the second stage combustion part. That is, in the first stage combustion part which is used from start-up to a prescribed low load, diffusion combustion which has a wide operation range is used, and then the combustion is shifted from independent combustion in the above-mentioned first stage combustion part to simultaneous combustion in the first stage combustion part and in the second stage combustion part effecting premixed combustion in order to effect low NOx combustion even in a high load region, or individual combustion in the second stage combustion part in order to realize further low NOx combustion.

However, combustion subtly changes according to difference between combustor individuals, change in temperature or humidity of the combustion air or change in calorific amount and composition of the fuel. Particularly, in the case where the gas turbine is provided with a plurality of the combustors, since the combustion conditions of the respective combustors are different from each other, stable combustion is required further.

On the other hand, the NOx concentration changes sensitively to a fuel air ratio, and since a stable combustion range is narrow, fine control of the fuel air ratio is necessary.

Therefore, for the combustion condition of the second stage combustion part which is a premixed combustion part, it is necessary to finely control a quantity of fuel and a quantity of air within the narrow stable combustion range in order to lower the above-mentioned NOx concentration, while the combustion condition has a tendency for becoming very unstable because of influence of difference in combustor individuals, etc.

For this reason, even if secondary fuel which is fuel for the second stage combustion part is injected into the second stage combustion part, there was such possibility that firing from the first stage combustion part to the second stage combustion part could not be effected, so that the secondary fuel could not be ignited or was misfired in the second stage combustion part, or on the contrary, such possibility that the fuel quantity injected became a little more than the quantity corresponding to the air quantity, so that the corresponding portions were damaged by burning with the flame being approached.

As conventional technique, there is a control method of continuously operating a gas turbine as shown in JP A 7-63334, in which as for abnormal combustion condition in a second stage combustion part, a quantity of state representative of the combustion condition of above-mentioned combustor or gas turbine is monitored, when it exceeds an allowable value and the combustion condition is regarded as an abnormal combustion, a load of the gas turbine is lowered at a stroke to a low load of individual combustion operation in the first stage combustion part for diffusion combustion which is stable in combustion, whereby the gas turbine is continuously operated.

SUMMARY OF THE INVENTION

A first object of the present invention is to provide a control method of a gas turbine having a two-stage type combustor effecting diffusion combustion and premixed combustion, which method enables the gas turbine to avoid lowering in load to a low load region and to extremely suppress a decrease of power generation by continuously operating the gas turbine in a prescribed low load region in a use region of the premixed combustion part when an abnormal combustion occurs in the combustor.

Further, a second object of the present invention is to provide a control method of a gas turbine having a two-stage type combustor effecting diffusion combustion and premixed combustion, which method enables the gas turbine to avoid lowering in load to a low load region by continuously operating the gas turbine in a prescribed low load region in a use region of the premixed combustion part when an abnormal combustion occurs in the combustor, and to reduce a time period until the plant is restored to a prescribed rated load by monitoring a quantity of state representative of combustion condition of the above-mentioned combustor or gas turbine and rapidly restoring to an original operation condition.

The present invention made a control method of a gas turbine having a plurality of combustors each of which has a first stage combustion part effecting diffusion combustion and a second stage combustion part effecting premixed combustion to attain the effected object by monitoring a quantity of state representative of combustion condition of the above-mentioned combustor or gas turbine, and regarding the combustion condition as abnormal combustion and lowering the gas turbine load to a prescribed partial load when the quantity of state exceeds an allowable value, thereby to continuously operate it.

Further, during control of the gas turbine in which the combustion is regarded as being abnormal and the load is lowered as mentioned above, the control is effected so that an opening of air compressor inlet guide vanes is kept as it is or reduced to decrease, whereby a fuel air ratio is lowered and the possibility that apparatus and devices are damaged is reduced.

Further, the present invention is so made that the above-mentioned quantity of state is taken by at least one of combustion gas temperature or metal temperature of the combustor or piping around the combustor, or exhaust temperature of the gas turbine, or combination of any two or more temperatures thereof, and abnormality is taken by at least one of an absolute value, variation range and change rate of the quantity of state, or combination of any two or more values thereof.

Further, the expected object is attained in the control method of a gas turbine in which in the case where during continuous operation at a prescribed partial load to which the load is lowered, the above-mentioned quantity of state is monitored and comes within an allowable value, or further, in the case where a prescribed time has passed, the combustion condition is regarded as being freed from the abnormal condition and a control quantity is automatically restored to a set value before occurrence of the abnormal condition.

DESCRIPTION OF EMBODIMENT

A gas turbine of an embodiment of the present invention will be described hereunder, referring to the drawings.

Figure 1:
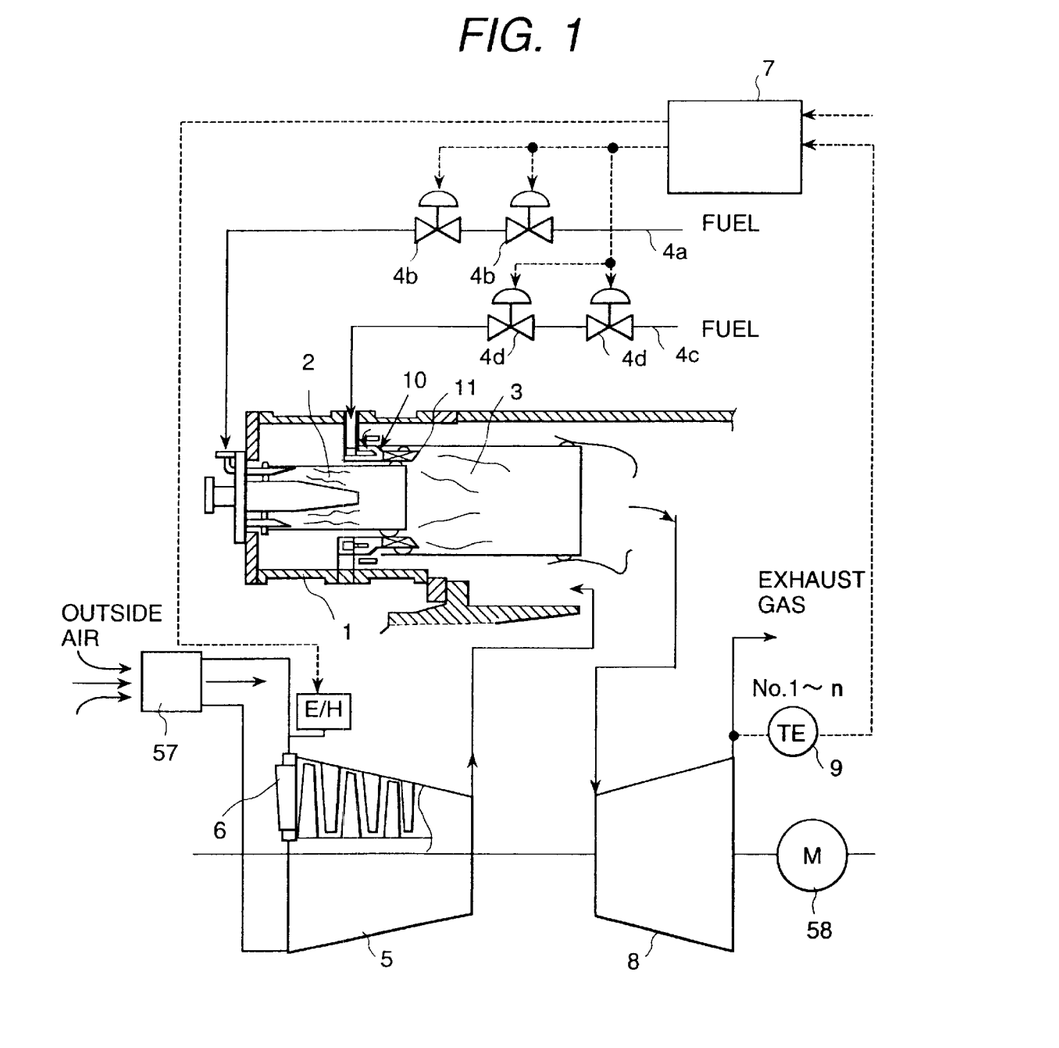
FIG. 1 is a view of a system construction of a gas turbine of an embodiment of the present invention.

FIG. 1 is a view showing a systematic construction of a gas turbine of an embodiment of the present invention.

In FIG. 1, combustion air is introduced into a compressor 5 through a suction filter 57 and supplied to a two stage type combustor 1. Inlet guide vanes 6 are, arranged at the inlet of the compressor 5 to adjust a flow rate of the air to be supplied to the combustor 1. Combustion gas generated in the two stage type combustor 1 through burning drives a turbine section 8 and generates electric power by a generator 58 which is a load of the gas turbine.

As shown in FIG. 1, the two stage type combustor 1 has a first stage combustion part 2 which is a diffusion combustion part effecting diffusion combustion and a second stage combustion part 3 which is a premixed combustion part effecting premixed combustion.

The gas turbine having the above-mentioned two stage type combustor is a combustion system in which it is possible to achieve low NOx combustion even in a very wide range of change in fuel air ratio, that is, a ratio between a fuel quantity and an air quantity, during operation from the start-up to the rated load.

In order to achieve the above-mentioned low NOx combustion, diffusion combustion which has a wide operation range is employed in the first stage combustion part 2 of the combustor used from start-up to the rated load, and independent combustion is effected by the first stage combustion part 2 in a region from start-up to a low load. In order to attain low NOx in a high load region after that, also, simultaneous combustion is effected in both the first stage combustion part 2 and the second stage combustion part 3 which employs a premixed combustion system of the combustor, and in order to reduce Nox emission in a further high load region, the combustion condition is shifted to independent combustion in the second stage combustion part 3 according to load.

Further, for control of the above-mentioned fuel air ratio, the fuel is adjusted by opening control of fuel valves 4b, 4d mounted on fuel lines 4a, 4c through which fuel is injected into the first stage combustion part 2 and the second stage combustion part 3 of the two stage type combustor 1, respectively. On the other hand, the air is adjusted by controlling an opening of variable vanes called the inlet guide vanes 6 provided at the inlet side of the air compressor 5.

Usually, during load operation of the gas turbine, respective openings of the above-mentioned fuel valve 4 and inlet guide vanes 6 are adjusted by signals from a control unit 7 according to a quantity required of the load so that the fuel air ratio is adjusted to a fuel air ratio at which the combustor can maintain a stable combustion condition.

However, as mentioned above, the fuel air ratio is necessary to be adjusted suitably over a wide range, while combustion changes subtly according to difference in combustor individuals, change in temperature or humidity of combustion air or change in calorific amount or composition of fuel. Particularly, in the case where the gas turbine is provided with a plurality of the combustors, since combustion conditions of the respective combustors are different from one another, in some cases, stable combustion can not be attained in all the combustors.

Such unstable combustion conditions can be detected from measurement by a plurality of exhaust temperature measuring thermoelectric couples 9 arranged circumferentially at an exhaust side of the turbine section 8, or measurement by a combustor metal temperature measuring thermoelectric couple 11 arranged inside a swirler 10 positioned in the second stage combustion part 3 of the combustor 1.

Further, as means for confirming unstable combustion condition other than the above means, temperature measuring devices for measuring combustion gas temperature inside the combustor, combustion gas temperature inside piping around the combustor, and metal temperature of piping around the combustor, each of which presents the same tendency as in the above-mentioned positions when the instability of combustion occurs, are arranged at the corresponding positions, and the instability of the combustion can be taken by measuring those temperatures.

Figure 2:
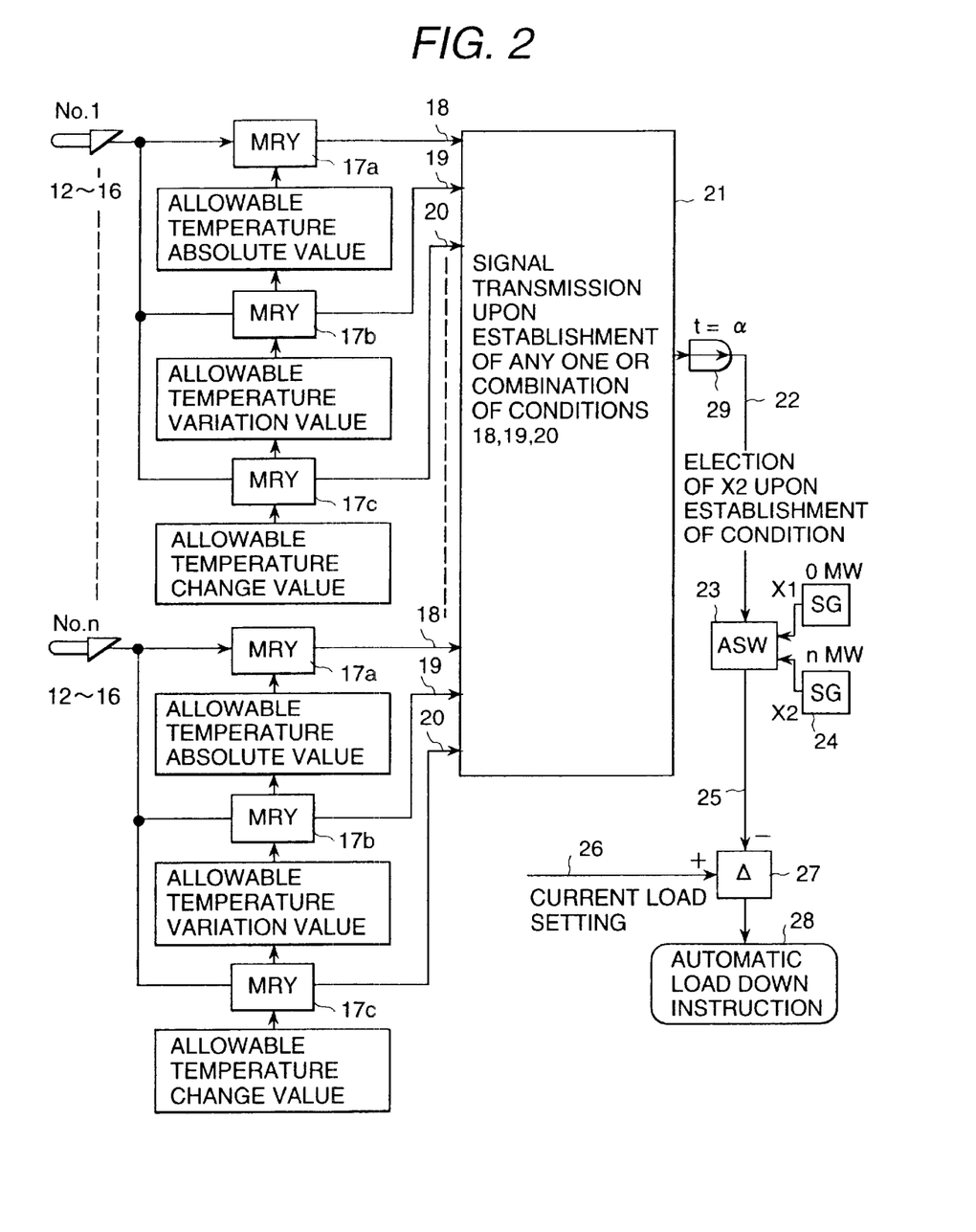
FIG. 2 is a block diagram of control to a prescribed load in a control unit of the embodiment of the present invention.

FIG. 2 is a block diagram of control in which the gas turbine is controlled to a prescribed partial load by the control unit 7 when abnormal combustion occurred in the two stage type combustor 1.

In FIG. 2, as a quantity of state representative of combustion condition of the combustor, there are combustor inside combustion gas temperature 12, combustor metal temperature 13, combustor around piping inside combustion gas temperature 14, combustor around piping inside metal temperature 15 or exhaust temperature 16, etc., however, explanation is made, taking the combustor metal temperature 13 as an example.

The measuring position of the combustor metal temperature measuring thermoelectric couple 11 for measuring the combustor metal temperature 13 is shown in FIG. 1.

In FIG. 2, the combustor metal temperatures 13 in a plurality of the two stage type combustors 1 arranged in the peripheral portion of the gas turbine are detected by total n thermoelectric couples 11 mounted in the second stage combustion parts of respective combustors 1. Each combustor metal temperature 13 is detected, and in the case where any one of temperature, temperature variation and temperature change rate of the really measured combustor metal temperature value is judged to exceed a preset allowable value by arithmetic units 17a to 17c each including a monitor relay (FIG. 2 shows only MRY (monitor relay)), the combustion condition is regarded as being abnormal and a signal or signals 18, 19, 20 are issued.

For example, as for setting of the arithmetic unit 17*a* judging abnormality of temperature itself among the arithmetic units 17*a* to 17*c*, usually, the combustor metal temperature is about 500–600° C. at time of operation of 100% load, and if fuel is overshot, flame approaches to the measuring position and the above-mentioned temperature rises, so that such a temperature that apparatus and devices are prevented from being broken is set, considering that the melting point of material of the corresponding portion is about 800–900° C.

In an example of concrete setting of an allowable temperature, the allowable temperature is 750° C. or more at which the combustion is regarded as being abnormal and the apparatus and devices are prevented from being broken, or, the allowable temperature is set 725° C. or more at which the combustion is regarded as being abnormal, whereby faster response can be taken for the abnormal combustion.

Further, in the case where abnormal combustion occurs as mentioned above, the temperature rapidly rises, whereby variation ranges and change rates also remarkably change as compared with the time of usual operation, so that it is possible to detect the change and judge abnormal combustion in the same manner as the allowable temperature.

One example of setting of each of the arithmetic units 17*b*, 17*c* judging abnormality of the above-mentioned variation range or change rate is explained hereunder. In the case of use of the variation range, as. mentioned above, since the combustor metal temperature is usually about 500–600° C. and the melting point of material of the corresponding position is 800–900° C., the allowable variation range is set 200° C. or more at which the combustion is regarded as being abnormal, thereby to prevent the apparatus and devices from being damaged. Further, by setting the allowable temperature to 150° C. or more, more rapid response can be made in the time of abnormal combustion.

On the other hand, as for the change rate, since in some cases, the temperature of apparatus and devices rises to such a temperature that they are broken in 1 to 2 seconds when abnormality in combustion occurred, the allowable change rate is set 100° C./sec or more at which the combustion is regarded as being abnormal, thereby the apparatus and devices are prevented from being damaged. Further, by setting the allowable temperature change rate to 200° C./sec. or more, a more rapid response can be made when the combustion is abnormal.

Therefore, it is possible to detect abnormality of combustion by any one of the above-mentioned conditions, or by combination of two or more of the conditions.

When such abnormality of combustion occurred, hitherto, the combustion was changed to independent combustion of the first stage combustion part in which a range of stable combustion condition is wide and the operation was continuously effected as shown in the previously described conventional technique.

Figure 4:
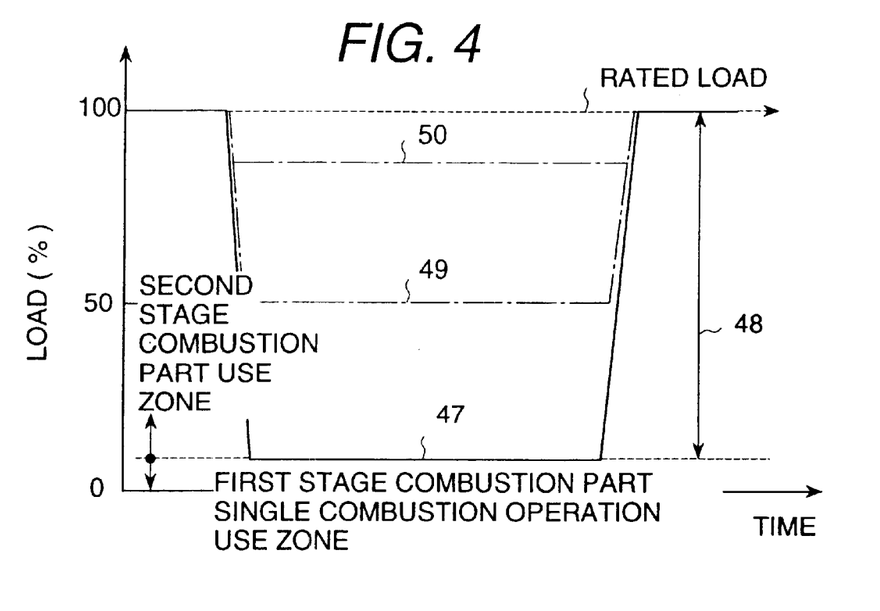
FIG. 4 is a diagram showing a state of load in the case where combustion abnormality occurs, in the gas turbine control method according to the present invention and in a conventional control method.

However, in the above operation method, since a region 47 in which the independent combustion of the first stage combustion part is in a low load region as shown in FIG. 4, stabler combustion condition could be maintained, while decrease 48 in power generation amount was large in that period because of lowering the combustion condition into the low load region.

Further, much time was required for freeing the combustion from being abnormal and restoring the combustion condition to the condition before occurrence of the abnormality, and an influence given to the system was not little.

Here, the present invention is so made that when a quantity of state for judging abnormality of the combustion condition exceeds an allowable value and the combustion condition is regarded as being abnormal, an instruction to automatically decrease the load to a prescribed partial load in a use region of the second stage combustion part is issued.

That is, when the gas turbine is operated by lowering the load to a prescribed partial load in the use region of the second stage combustion part, the combustion temperature decreases to reduce a thermal load of a high temperature portion around the combustor and protection of the apparatus and devices results. Further, not to reduce the combustion condition to a low load region is the improvement that the reduction of power generation amount is extremely suppressed.

Further, in the case where while the operation is continued under the condition that the load is lowered to the prescribed partial load by the above control, a quantity of state representative of the combustion condition of respective combustors or gas turbine is monitored, and when the quantity of state becomes within an allowable value or when a prescribed time has passed, the combustion condition is regarded as being freed from the abnormal condition, and a fuel instruction, which is a control quantity, is automatically restored to a set value before occurrence of the abnormality, whereby the time required for the restoration is shortened without lowering the combustion condition to the low load region, and an influence given to the system can be extremely suppressed while giving priority to protection of the apparatus and devices.

Concretely, when the combustion condition is regarded as being abnormal in FIG. 2 as mentioned above and signals 18, 19, 20 are issued, the arithmetic unit 21 issues a signal 22 when a set load restriction condition is satisfied by any one or combination of the sent signals 18, 19 and 20.

Upon issue of the signal 22, a switch 23 select a signal X2 from signals X1, X2 from a signal generator 24, that is, a signal 25 is switched from 0 MW to n MW through the switch 23. A signal from a current load setting 26 is sent to a subtracting device 27, and an automatic load-down instruction 28 is issued so as to lower load setting by n MW by passing the signal 25 through the subtraction device 27.

By receiving the above-mentioned automatic load down instruction 28 thereby to lower gas turbine fuel supply, the gas turbine is adjusted to a prescribed partial load.

The above-mentioned partial load is set within the use region of the second stage combustion part as shown in FIG. 4, for example, in the case 50 wherein the load is not desired to extremely lower the load, the load is set to a load of about 85–90% at maximum, and in the case 49 where operation is desired to continue at a safety side in view of protection of the apparatus and devices, the partial load is set a load of about 45–50% at minimum.

After establishment of the combustion abnormality condition, the signal 22 is kept for a certain time a by a timer 29, and then, in the case where the quantity of state representative of the combustion condition returned within the allowable value, the combustion condition is regarded as being freed from the abnormal combustion condition and the signal is reset.

Upon the reset of the signal, the signal 25 from the signal generator 24 is switched again from n MW to 0 MW and the automatic load down instruction 28 also is released, whereby the gas turbine fuel supply increases to a value set before the abnormality and the gas turbine load is automatically restored to the load set before the abnormality.

By employing the present control method, reduction of power generation at time of occurrence of the abnormality of combustion is extremely suppressed and it is possible to shorten the time required for restoration of the gas turbine to the condition before occurrence of the abnormality, as compared with a control method employing independent operation of the first stage combustion part. According to the above-mentioned one example, as for lowering in power generation, power reduction corresponding to about 80% load at maximum can be decreased and the time required for restoration to the operation condition before occurrence of the abnormality can be reduced by about 30 minutes at maximum.

On the other hand, in the case where the abnormality of combustion condition exceeds remarkably the automatic load down instruction condition, or in the case where even if the combustion condition is shifted to the condition under which the load is lowered to the prescribed partial load, the quantity of state representative of the combustion condition exceeds the allowable value and the abnormal combustion continues, the operation is shifted to independent operation of the first stage combustion part as in the conventional control method, so that there is no problem of protection.

The above explanation is made, taking the combustor metal temperature 13 as an example of measuring temperature.

The other items for monitoring the combustion condition also can detect abnormal combustion in a similar manner to one using the combustor metal temperature 13 because change in temperature when the combustion is unstable gives the same tendency as the combustor metal temperature 13.

In the case where exhaust temperature is used for measuring temperature, the exhaust temperature at time of operation of 100% load is about 590–630° C. which is dependent on atmospheric temperature and the operation is effected at a fixed combustion temperature.

As for setting of the arithmetic units 17a–17c judging abnormality, an example of each case is given as follows. As for an allowable temperature, since an exhaust temperature control value is different in magnitude in dependence on an atmospheric temperature as mentioned above, a set value is taken variably from about 600–640° C. according to the atmospheric temperature.

As for an allowable temperature range, the combustion is regarded as being abnormal when the range is 10° C. or more, and as for an allowable temperature change rate, since the temperature rapidly rises in 1 to 2 seconds in a similar manner to the combustor metal temperature, the combustion is regarded as being abnormal at 10° C./sec and the apparatus and devices are protected from being broken.

Further, in the above-mentioned control, in the case where the combustion is regarded as being abnormal, since the gas turbine is lowered to a prescribed partial load, the fuel is restricted to supply according to a fuel instruction signal, however, in the conventional technique, a control method of effecting closing operation of the air compressor inlet guide vanes was taken in addition to the restriction of fuel.

This control method has no particular problem as usual control because the operation is effected so as to maintain a suitable fuel air ratio.

However, when the combustion is abnormal, particularly when fuel is overshot to an air flow rate whereby the combustion becomes abnormal, since a temperature of each portion around the combustor rises, the possibility to damage the apparatus and devices becomes high, so that it is desired to lower the fuel air ratio.

Therefore, in the present invention, in the course of control at time of load lowering of the gas turbine, even if the combustion is regarded as being abnormal, the opening of the air compressor inlet vanes is kept, or the fuel air ratio is lowered by commonly use of the compressor inlet vanes so as to decrease the reduction of opening.

Concretely, it is realized in the following method.

Figure 3:
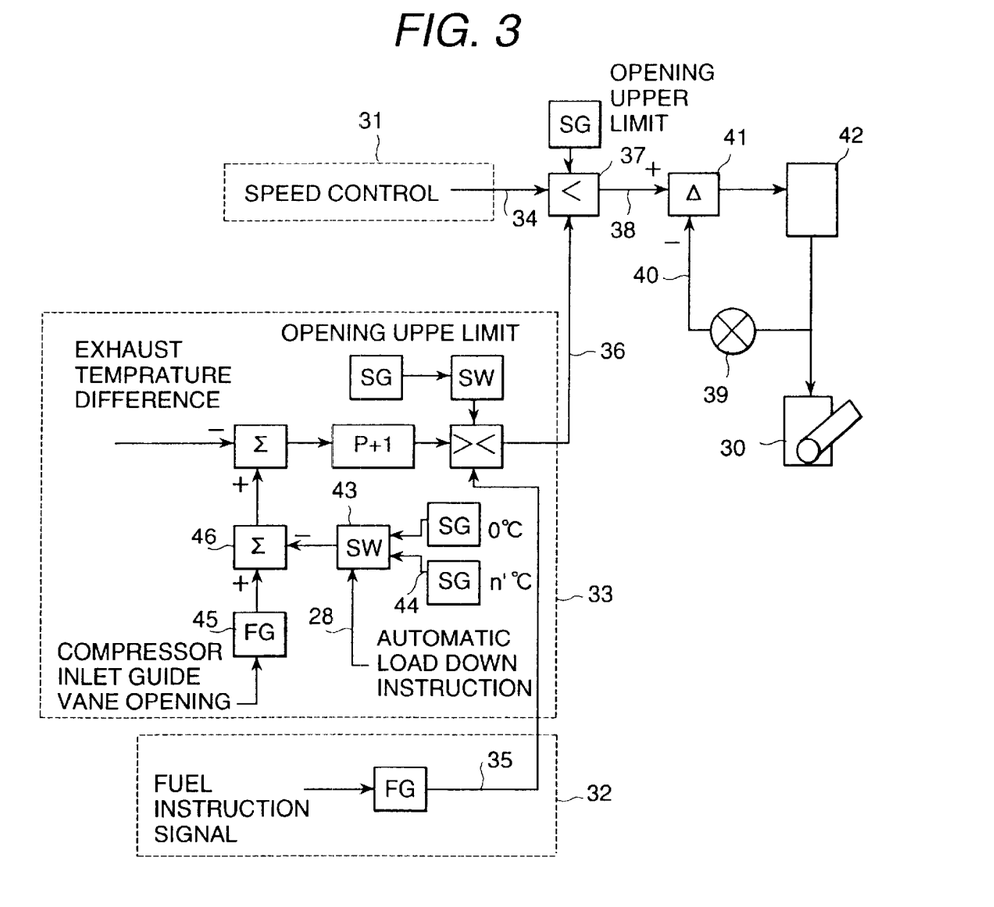
FIG. 3 is a block diagram for explaining control of an air compressor inlet guide vane opening of the embodiment of the present invention.

In addition to the above-mentioned control unit, a logic diagram for explaining an embodiment of the compressor inlet guide vane control is shown in FIG. 3.

The compressor inlet guide vane control can be classified largely into a speed control part 31 by the number of revolution of gas turbine, a control part 32 by fuel instruction signal and a control part 33 by exhaust temperature. A minimum signal is selected by a low value selection device 37 from vane opening signals 34, 35, 36 generated in respective control parts 31, 32, 33, and the signal becomes an inlet guide vane opening instruction 38.

A difference 41 between an inlet guide vane opening instruction 38 obtained by the above and a real opening feedback value 40 obtained from an opening oscillator 39 is controlled by a servo 42, whereby the opening of the inlet guide vanes 30 is controlled.

Particularly, the present invention is to improve on a control method of the control part 33 by exhaust temperature during control of the inlet guide vanes in the case where the combustion is regarded as abnormal since the inlet guide vane control is being controlled during load operation of gas turbine.

Figure 5:
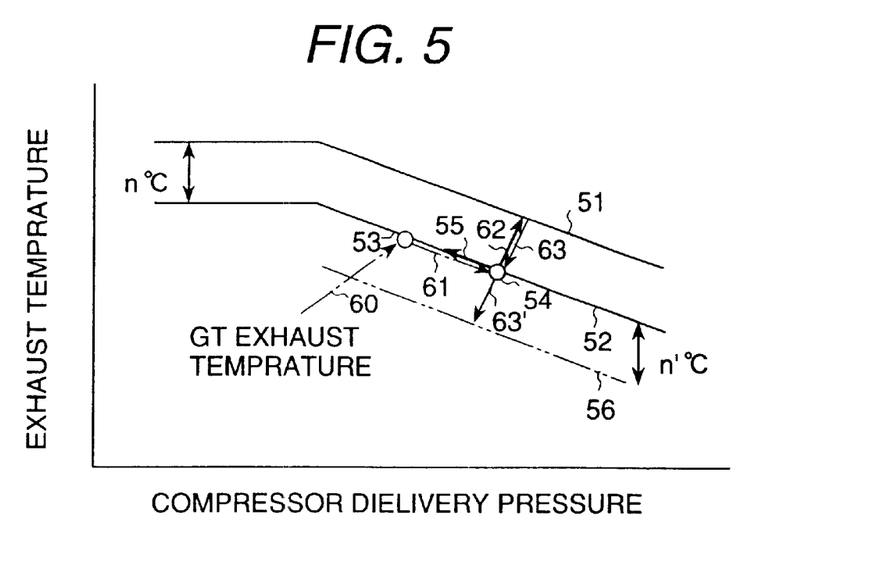
FIG. 5 is a diagram showing exhaust temperature control of the gas turbine of the present invention.

Exhaust temperature control conditions during gas turbine operation according to the present invention are shown in FIG. 5.

In the gas turbine exhaust temperature control, at the time of start-up, a exhaust temperature rising rate is controlled to decrease thermal stress caused in passage portions for high temperature gas, and during load operation, control of an upper limit value of the exhaust temperature is conducted by effecting proportion/integration-control of difference between an exhaust temperature set value and a real value from the detector, whereby the gas turbine upper limit combustion temperature is controlled so as to be constant.

Further, as the exhaust temperature set value, a combustion temperature constant line called "a base control operation line" 51 is formed on the basis of values calculated using, as parameter, the compressor delivery pressure detected by an oscillator mounted downstream of the air compressor.

Further, in the gas turbine exhaust temperature control, an "IGV control line" 52 along which exhaust temperature set values are set by the compressor inlet guide vanes is provided at a position to which the above-mentioned "base control operation line" 51 is parallel-shifted to the lower side by n° C., using a function of the compressor inlet guide vane opening.

This is because the exhaust temperature control is controlled by both the fuel valve (fuel side) and the inlet guide vane opening (air side) however, since a response of the inlet guide vane opening has larger delay in following than the fuel valve, in the case where two parameters are controlled simultaneously in the control system having a difference in response, stable exhaust (combustion) temperature control can not be effected. Therefore, in the present embodiment, the fuel valve and inlet guide vanes are switched to be individually operated to control the exhaust temperature.

Hereunder, the exhaust temperature control in time of load-up operation will be concretely explained, referring to FIG. 5. For example, when the output of the gas turbine is raised from a partial load condition to a prescribed load condition, first, as shown by 60 in FIG. 5, openings of both the fuel valve and compressor inlet guide vanes are controlled to raise the exhaust temperature until the exhaust temperature reaches on the "IGV control line" 52 provided at the position parallel-shifted by n° C. from the "base control operation line" 51. Then, at the time the exhaust temperature reached the "IGV control line" 52, the control is switched to independent control of only the compressor inlet guide vanes while keeping the opening of the fuel valve as it is, as an IGV control starting point 53 based on exhaust temperature. After reaching the IGV control starting point 53, the output of the gas turbine is raised and the exhaust temperature is controlled along the "IGV control line" 52 shown by 61 until the opening of the inlet guide vanes for practicing adjustment on the air side reaches the full opening.

After that, in the control of the inlet guide vanes on the "IGV control line" 52, the time the inlet guide vane opening has fully opened is shown as an IGV opening full opening point 54, and the exhaust temperature control by control of the fuel valve is effected by switching from the "IGV control line" 52 to the "base control operation line" 51. At this time, the opening of the inlet guide vanes has already been fully opened and the air side becomes stable in condition. The fuel side is adjusted by the fuel valve according to a fuel instruction signal by the exhaust temperature control under the condition the inlet guide vanes are left as fully opened, whereby the exhaust temperature is controlled along the "base control operation line" 51.

In this manner, by controlling individually the two parameters, stable exhaust temperature control can be carried out.

Next, the exhaust temperature control in time of load-down operation will be explained. In the course of the above-mentioned automatic load-down control of the gas turbine, in the conventional control method, in the case where the combustion is regarded as being abnormal, fuel supply is reduced by the automatic load-down instruction 28 according to an fuel instruction, and the exhaust temperature control is carried out in a reverse procedures to the above-mentioned control in the time of load-up.

Hereunder, the exhaust temperature control in the time of load-down will be explained, referring to FIG. 5. In the case where an automatic load-down instruction is issued during operation on the "base control operation line" 51, the exhaust temperature control is switched from the "base control operation line" 51 to the "ICV control line" 52, as shown by 63. In the course until the exhaust temperature reaches from "base control operation line" 51 to the "ICV control line" 52, the fuel supply is reduced under the condition that the opening of the inlet guide vanes is kept fully open. When the exhaust temperature reached the "ICV control line" 52, such control as shown by 55 is effected on the "IGV control line" 52 while reducing the opening of the inlet guide vanes fully opened.

At this time, at the time the exhaust temperature reaches the "ICV control line" 52 from the "base control operation line" 51, the control is switched to opening control of the inlet guide vanes, and the fuel reduction by the fuel valve is not effected once. That is, since an air supply quantity is being reduced while keeping a fuel supply quantity constant, the fuel air ratio increases according to closing operation of the inlet guide vanes as shown by 55, as a result, the exhaust temperature rises again.

On the contrary, in the time of abnormal combustion, it is desirable to operate with the fuel air ratio being decreased as low as possible, in order to reduce the possibility to damage apparatus and devices.

Therefore, in the present invention, in FIG. 3, when the automatic load down instruction 28 is issued, a signal 44 from a signal generator is switched from 0° C. to n'° C. through a switch 43, and a signal from a function generator 45 which takes, as a parameter, a compressor inlet guide vane opening setting for forming the "IGV control line" 52 is made lower by n'° C. than a current set temperature, whereby an IGV control line 56 formed according to automatic load down operation is formed at the position that the "IGV control line" 52 shown in FIG. 5 is lowered on appearance by n'° C., so that in the automatic load down course, a fuel adjustment range by the fuel valve until it reaches to the "IGV control line" 52 expands (that is, the control shown by 63 in FIG. 5 extends to a control shown by 63 and 63'), it is possible to maintain the compressor inlet guide vane opening, or reduce the opening decrease and it is possible to suppress a increase of fuel air ratio.

Further, the present control returns an initial set by resetting the automatic load down instruction 28.

As explained above, according to the present invention, in the gas turbine having two stage type combustors, it is possible to effect continuous operation in a prescribed load region in the second stage combustion part use region while suppressing a decrease of power generation even if combustion abnormality occurs, by extremely excluding an influence to the system side (by not damaging it) and avoiding lowering the combustion condition of the gas turbine to a low load region. Further, if it is possible to confirm to have no problem on apparatus and devices by monitoring a quantity of state representative of the combustion condition of the combustor or the gas turbine under the above operation condition, it is possible to be rapidly restored to the initial operation condition and to shorten a time for restoration.

As for effects attained through the above, as compared with independent combustion in the first stage combustion part which is a conventional technique, as for decrease in power generation, it is possible to reduce the power generation decrease corresponding to about 80% load at maximum and about 40% load at minimum. Further, as for the time required for restoration from occurrence of combustion abnormality to the operation condition before occurrence of the abnormality, it is possible to shorten about 30 minutes at maximum as compared with the individual combustion in the first stage combustion part.

What is claimed is:

1. A gas turbine provided with a plurality of combustors, each of which has a first stage combustion part effecting diffusion combustion and a second stage combustion part effecting premixed combustion, comprising:
   a control unit for monitoring a quantity of state representative of the combustion condition of said combustor or gas turbine, judging the combustion condition as being abnormal combustion when said quantity of state exceeds an allowable value and controlling said gas turbine so that a gas turbine load reaches a predetermined partial load within a use region of the second stage combustion part, thereby to continue the operation.

2. A gas turbine provided with a plurality of combustors, each of which has a first stage combustion part effecting diffusion combustion and a second stage combustion part effecting premixed combustion, comprising:

a control unit for monitoring a quantity of state representative of the combustion condition of said combustor or gas turbine, judging the combustion condition as being abnormal combustion when said quantity of state exceeds an allowable value, controlling said gas turbine so that a gas turbine load reaches a predetermined partial load within a use region of the second stage combustion part thereby to continue the operation and restoring a control quantity to a set value before the abnormal combustion when said quantity of state has returned within the allowable value during continuation of the operation with the lowered gas turbine load.

3. A gas turbine provided with a plurality of combustors, each of which has a first stage combustion part effecting diffusion combustion and a second stage combustion part effecting premixed combustion, comprising:

a control unit for monitoring a quantity of state representative of the combustion condition of said combustor or gas turbine, judging the combustion condition as being abnormal combustion when said quantity of state exceeds an allowable value, controlling said gas turbine so that a gas turbine load reaches a predetermined partial load within a use region of the second stage, combustion part thereby to continue the operation and restoring a control quantity to a set value before the abnormal combustion after a predetermined time has passed during continuation of the operation with the lowered gas turbine load.

4. A gas turbine provided with a plurality of combustors, each of which has a first stage combustion part effecting diffusion combustion and a second stage combustion part effecting premixed combustion, comprising:

a measuring device for measuring a quantity of state representative of the combustion condition of said combustor or gas turbine; and a control unit for judging the combustion condition as being abnormal combustion when said quantity of state exceeds an allowable value and controlling said gas turbine so that a gas turbine load reaches a predetermined partial load within a use region of the second stage combustion part, thereby to continue the operation.

5. A gas turbine according to claim 1, wherein said quantity of state is combustion gas temperature.

6. A gas turbine according to claim 1, wherein said quantity of state is metal temperature of a combustion swirler in the premixed combustion part.

7. A gas turbine according to claim 1, wherein judgement of the abnormal condition is effected by an absolute value of said quantity of state.

8. A gas turbine according to claim 1, wherein an opening of air compressor inlet guide vane is kept as it is or is reduced at time of load down of said gas turbine.

9. A gas turbine according to claim 1, wherein said quantity of state is metal temperature of said combustor.

10. A gas turbine according to claim 1, wherein said quantity of state is metal temperature of piping around said combustor.

11. A gas turbine according to claim 1, wherein said quantity of state is exhaust temperature of said gas turbine.

12. A gas turbine according to claim 1, wherein judgement of the abnormal condition is effected by a variation range of said quantity of state.

13. A gas turbine according to claim 1, wherein judgement of the abnormal condition is effected by a change of rate of said quantity of state.

14. A control unit of a gas turbine provided with a plurality of combustors each of which has a first stage combustion part effecting diffusion combustion and a second stage combustion part effecting premixed combustion, said control unit comprising:

means for monitoring a quantity of state representative of the combustion condition of said combustor or gas turbine;

means for judging the combustion condition as being abnormal combustion when said quantity of state exceeds an allowable value; and means for controlling said gas turbine so that a gas turbine load reaches a predetermined partial load within a use region of the second stage combustion part, thereby to continue the operation.

* * * * *